Oct. 8, 1940.  S. A. IONIDES  2,217,224
ALIDADE
Filed Oct. 3, 1938  2 Sheets-Sheet 1

INVENTOR.
STEPHEN A. IONIDES
BY Rollandet, McGrew & Campbell
ATTORNEYS.

Oct. 8, 1940.　　　　　S. A. IONIDES　　　　　2,217,224
ALIDADE
Filed Oct. 3, 1938　　　　　2 Sheets-Sheet 2

INVENTOR.
STEPHEN A. IONIDES
BY Rollandet, McGrew & Campbell
ATTORNEYS.

Patented Oct. 8, 1940

2,217,224

UNITED STATES PATENT OFFICE 2,217,224

ALIDADE

Stephen A. Ionides, Denver, Colo., assignor to William Ainsworth & Sons, Inc., Denver, Colo., a corporation of Colorado Application October 3, 1938, Serial No. 233,049

4 Claims. (Cl. 33—72)

This invention relates to surveying instruments, and its primary object resides in providing an alidade for use in connection with any instrument having a circular scale, for the principal purpose of reading horizontal angles in determining the position of steep inclines as, for example, raises or winzes of mines and other excavations.

A further object of the invention is to provide a device of very simple construction that may be utilized to increase the utility of a simple compass, by adapting it for use as a sureyor's transit.

Other objects of the invention are to be found in novel features of construction and arrangements of parts as will fully appear in the course of the following description.

While the improved alidade may be employed in association with any circular, graduated scale or with any compass having a magnetic needle, it is particularly designed for use with a scale or compass having a rim, ridge or transparent cover permitting of a rotary adjustment of the alidade about an axis alined with the center of the scale.

As an example of such use, reference is made to a compass of the so-called "Brunton" type in which a compass is enclosed in a casing having a glass cover surrounded by an upstanding circular rim.

In the accompanying drawings in the several views of which like parts are similarly designated, Figure 1 is a plan view of the improved alidade;

Figure 1:
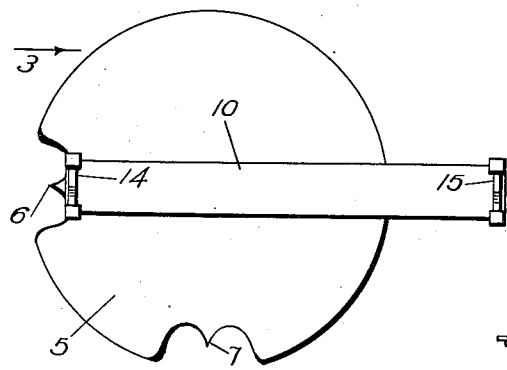
Figure 2:
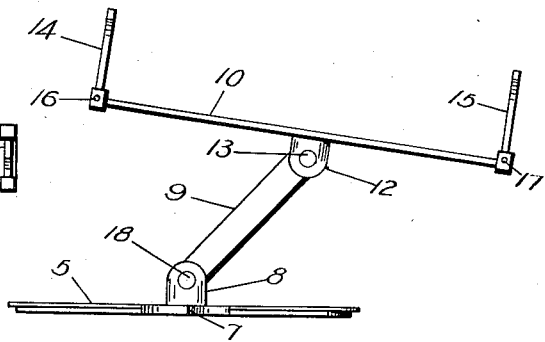
Figure 2 represents a side elevation of the alidade looking in the direction of the arrow 2 in Figure 1.
Figure 3:
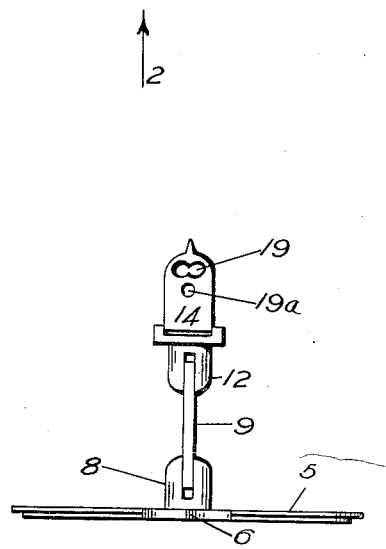
Figure 3 is a front elevation of the device, looking in the direction of the arrow 3 in Figure 1.

Referring more specifically to the drawings, the improved alidade as illustrated in Figures 1, 2 and 3, comprising a base 5 consisting of a flat circular plate having at its peripheral edge indentations to provide two pointers 6 and 7, at right angles to each other. Centrally of the base plate is a bifurcated post 8 upon which the alidade proper is pivotally mounted through the intermediary of a link 9.

The alidade consists of a flat bar 10 having at its underside a centrally located bifurcated knob 12 for its pivotal connection with the link as at 13, and having at its opposite ends two alined sights 14 and 15. These sights in their preferred form consist of arms hinged to the bar as at 16 and 17, for convenience in carrying when the device is not in use. Each sight-arm has two sight-openings 19 and 19a which when the arms are in their operative position at right angles to the bar are alined in sight-lines parallel to the bar.

The link 9 is hinged to the post 8 by a pivot 18, and it provides for the ready adjustment of the alidade with relation to its distance from the base plate and to any desired angle in a plane at right angles to the base. When not in use, the link and the alidade may be folded against the base plate, and the sight arms are folded upon the bar as stated hereinbefore.

Figure 4:
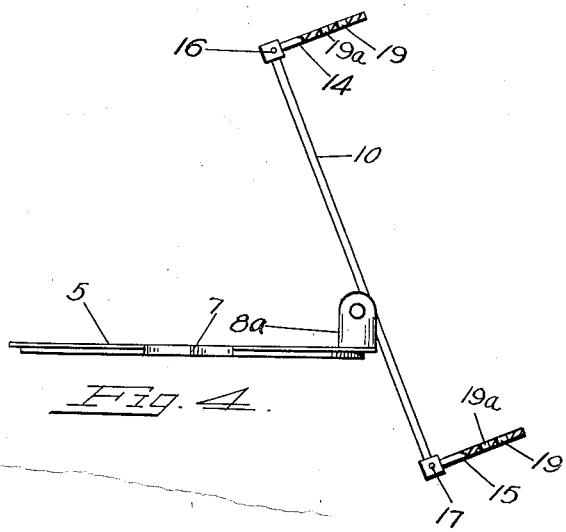
Figure 4 is a partially sectional elevation similar to Figure 2, showing a modified construction of the device.
Figure 7:
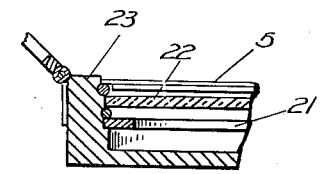
Figure 7 is a fragmentary section on the line 7—7 of Figure 5.

In the modified form of the device illustrated in Figure 4, the link is eliminated and the alidade is pivotally mounted upon a post 8a, similar to the post 8 and located adjacent the periphery of the base-plate.

In both constructions, the central axis of the alidade, parallel to its sight-veins extends in a vertical plane with one of the pointers at the periphery of the plate 5. The alidade in Figure 4 has been shown as pivoted at a point distant from its center. This, however, is not a positive requirement, since the pivot may be arranged at different distances from the center of the bar 16 or at the center of the same without affecting the utility of the device.

In the use of the alidade, it is placed upon a suitable surveying instrument for rotary movement relative to the graduated scale thereof.

Figure 6:
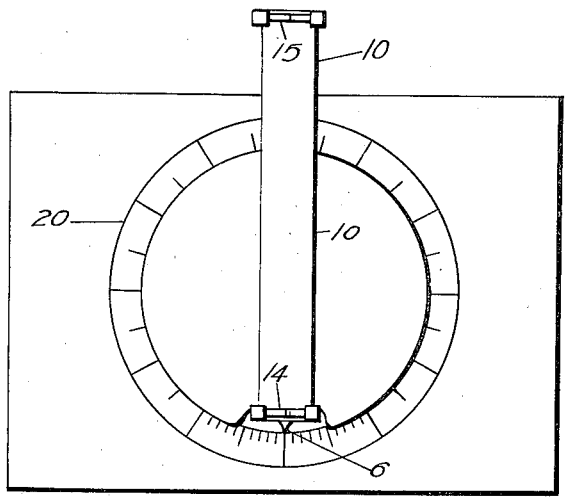
Figure 6 is a plan view of the alidade in position with relation to a simple circular scale.

In Figure 6 of the drawings, a simple circular scale is shown at 20, and the base plate 5 of the alidade is placed coaxially with the scale. It will be understood without further illustration that any suitable means, such as a circular rim, may be employed to maintain the co-axial relation of the base plate to the scale during rotary adjustment of the former.

In this, the simplest method of using the invention, the base plate of the alidade is turned about the center of the scale and the bar 10 is tilted about its pivot or pivots, until a distant station is sighted through the sight-veins determined by the alined sight-openings in the arms 14 and 15 of the alidade.

The horizontal angle of the sight-vein with relation to any given point, may then be read on the scale 20.

Figure 5:
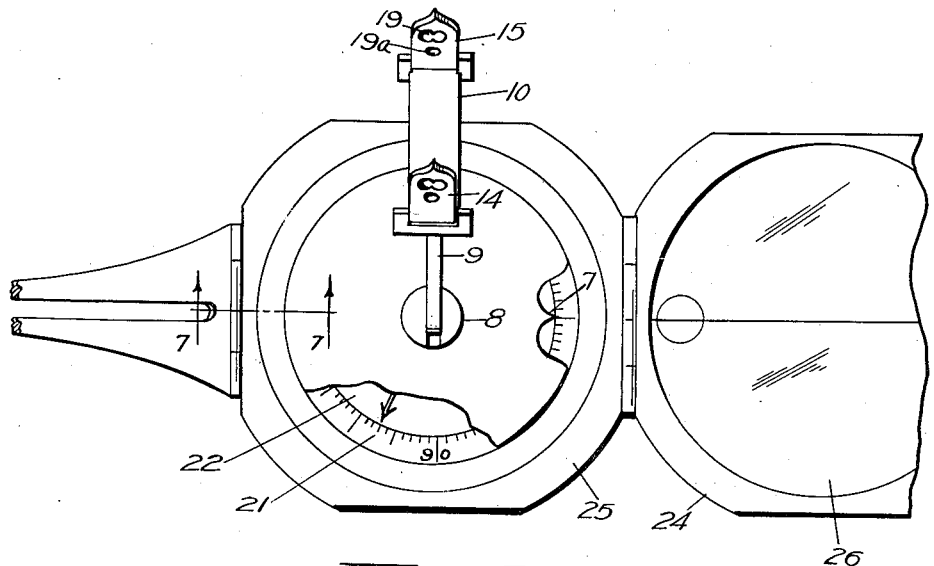
Figure 5 represents a partially broken plan view of a Brunton compass showing an accessory in accordance with the present invention, in its operative position with relation thereto, a part of the said accessory having been broken to show a subjacent part of the compass.

In Figure 5, is illustrated the use of the improved alidade in association with a surveying instrument having a compass 21. The view shows an instrument of the well-known "Brunton" type in which the compass is covered by a glass plate 22, set in an upstanding rim 23. The base plate of the device fits loosely within the rim, so that it may be rotatably adjusted upon the glass cover with relation to the scale of the compass.

In ordinary use, the surveying instrument is preferably mounted on a tripod, leveled and oriented with the needle set at the north point of the compass, or with the needle set to the degree of the magnetic variation in the particular locality, if true bearings and not magnetic bearings are wanted.

The alidade is then adjusted by rotation of its base plate until a given point at a distant station is seen through one of the sight-veins of the alidade, when the bearing of the station is given by the reading of the pointer at the periphery of the base plate, directly under the alidade-bar.

In an instrument of the "Brunton" type, proper attention must be given to reversal of the significance of the "E" and "W" designations on the scale, which are ordinarily reversed so as to give the desired readings correctly when the compass needle is used.

In the "Brunton" compass, the sights thereof are at opposite sides of the compass-box, one of said sights being provided by an opening in a hinged lid 24 of the compass-box 25, enclosing a mirror 26. It may happen that one or another of these sights, interferes with the taking of sights by the alidade, in which case the compass is oriented with the needle pointing to West or East, and the angle-observation is read by the pointer at the periphery of the base-plate, at right angles to that directly beneath the alidade-arm.

Aside from the above-described uses of the improved alidade which enables the operator to sight upon objects at practically any vertical angle, and determine the proper azimuth thereof, the invention if employed in association with a surveying instrument of the "Brunton" or other similar type, permits of using the instrument for taking azimuthal sights such as otherwise could only be taken with the use of a side or top auxiliary telescope such as forms part of mining transit-instruments at present in use, or on a special mining dial.

It is to be understood that the pointers 6 and 7 at the periphery of the base plate may be utilized in the operation of the device, cooperatively of one without another, in reading the horizontal angle of the alidade bar relative to a given point on the compass, and that in the simplest form of the device one of the pointers may be omitted.

Other variations in the form and arrangement of the parts comprised in the improved alidade, may be made within the scope of the invention as defined in the hereunto appended claims.

What I claim and desire to secure by Letters Patent is:

1. The combination with a compass inclusive of a scale and an upstanding annular rim, of a freely rotatable base having a pointer and supported concentrically within the confines of said rim to be guided thereby for rotation, and an alidade mounted on said base for pivotal movement relative thereto about a normally horizontal axis positioned parallel to the plane of said base and eccentric thereof.

2. A device of the character described comprising a disk-like base having a peripheral pointer and having a substantially unobstructed lower surface and having an unobstructed periphery whereby it is adapted to be placed upon a compass or the like having an upstanding rim for free rotation relative thereto, an alidade mounted on the base for pivotal movement about a normally horizontal axis, and having a plurality of sights positioned to establish a radial sight line transverse to the axis of said pivotal mounting and in predetermined angular relationship to the pointer.

3. A device of the character described comprising a disk-like base having a peripheral pointer and having a substantially unobstructed lower surface and having an unobstructed periphery whereby it is adapted to be placed upon a compass or the like having an upstanding rim for free rotation relative thereto, a link mounted on the base for pivotal movement about a normally horizontal axis, an alidade mounted on the link for pivotal movement relative thereto about a normally horizontal axis, and having a plurality of sights positioned to establish a radial sight line transverse to the axis of said pivotal mounting and in a vertical plane with the pointer.

4. The combination with a compass or the like having a transparent cover and an upstanding rim, of a disk having a pointer and having an unobstructed lower surface, supported over the cover and freely rotatable with reference to the compass and guided by the rim, an alidade mounted on the disk for pivotal movement about a normally horizontal axis, and having a plurality of sights positioned to establish a radial sight line transverse to the axis of said pivotal mounting and in a plane bearing a predetermined angular relationship to the pointer.

STEPHEN A. IONIDES.